United States Patent
Paluncic et al.

(10) Patent No.: US 8,087,902 B2
(45) Date of Patent: Jan. 3, 2012

(54) HYDRAULIC DEVICE WITH A LUBRICATING PUMP

(75) Inventors: Zdravko Paluncic, Ludwigshafen (DE); Markus Mandera, Leimen (DE); Ayzik Grach, Chesterfield, MO (US)

(73) Assignee: Lincoln GmbH, Walldorf (DE)

( * ) Notice: Subject to any disclaimer, the term of this patent is extended or adjusted under 35 U.S.C. 154(b) by 714 days.

(21) Appl. No.: 12/278,810

(22) PCT Filed: Jan. 18, 2007

(86) PCT No.: PCT/EP2007/000405
§ 371 (c)(1),
(2), (4) Date: Oct. 1, 2008

(87) PCT Pub. No.: WO2007/090508
PCT Pub. Date: Aug. 16, 2007

(65) Prior Publication Data
US 2009/0155093 A1    Jun. 18, 2009

(30) Foreign Application Priority Data
Feb. 10, 2006  (DE) ............... 20 2006 002 243 U

(51) Int. Cl.
*F04B 25/00* (2006.01)
*F04B 3/00* (2006.01)
*F04B 5/00* (2006.01)

(52) U.S. Cl. .......... 417/264; 417/98; 417/254; 417/256; 417/259; 417/260; 417/375

(58) Field of Classification Search .................. 417/217, 417/215, 98, 204, 254–268, 321, 375, 398–399, 417/401, 403, 309
See application file for complete search history.

(56) References Cited

U.S. PATENT DOCUMENTS

| | | | |
|---|---|---|---|
| 2,861,519 A | | 11/1958 | Houle |
| 3,354,787 A | * | 11/1967 | Takahata ......................... 91/222 |
| 3,597,121 A | * | 8/1971 | McClocklin .................. 417/400 |
| 4,352,644 A | * | 10/1982 | Landrum et al. .............. 417/402 |

(Continued)

FOREIGN PATENT DOCUMENTS

FR    1455389    4/1968

*Primary Examiner* — Nimeshkumar D. Patel
*Assistant Examiner* — Jose M Diaz
(74) *Attorney, Agent, or Firm* — Senniger Powers LLP

(57) ABSTRACT

The invention relates to a hydraulic device with a supply line for pressurized hydraulic fluid and with a lubricating pump that is connected to the supply line in a fluidic fashion. The lubricating pump comprises a hydraulic inlet, a pump element for conveying a lubricant from a reservoir to at least one lubricating point of the hydraulic device, and mechanism for producing a pump stroke of the pump element. The mechanism for producing a pump stroke comprises a base body, a piston unit movable in the base body, and a reversing mechanism for reversing the direction of movement of at least one element of the piston unit. The reversing mechanism comprises at least one bypass formed by at least one recess, and at least one elastic element acting upon the piston unit in a first direction oriented toward the hydraulic inlet whereby the piston unit can be displaced in the base body in an oscillating fashion between a closed position in which a fluid connection between the hydraulic inlet and the hydraulic outlet is blocked, and an open position in which said fluid connection is unblocked in order to produce a pump stroke of the pump element.

13 Claims, 2 Drawing Sheets

U.S. PATENT DOCUMENTS

| | | | | |
|---|---|---|---|---|
| 4,761,120 A | * | 8/1988 | Mayer et al. | 417/403 |
| 5,341,723 A | * | 8/1994 | Hung | 91/224 |
| 6,012,377 A | * | 1/2000 | Hung | 91/229 |
| 6,302,656 B1 | * | 10/2001 | Hirota | 417/222.2 |
| 6,415,704 B1 | * | 7/2002 | Wang | 91/224 |
| 6,494,347 B1 | | 12/2002 | Yeh | |
| 6,736,292 B2 | | 5/2004 | Grach | |
| 6,923,348 B2 | * | 8/2005 | Grach et al. | 222/262 |
| 2004/0129735 A1 | * | 7/2004 | Grach et al. | 222/389 |

* cited by examiner

HYDRAULIC DEVICE WITH A LUBRICATING PUMP

BACKGROUND OF THE INVENTION

The invention pertains to a hydraulic device, particularly a hydraulic percussion device, with a supply line for pressurized hydraulic fluid, e.g., hydraulic oil, and with a lubricating pump that is connected to the supply line in a fluidic fashion via a hydraulic inlet and features a pump element for conveying a lubricant, e.g., lubricating grease, from a reservoir to at least one lubricating point of the hydraulic device to be supplied with lubricant, as well as means for producing a pump stroke of the pump element.

DE 20 2004 019 503 U1 discloses a lubricating pump, e.g., for a hydraulic percussion hammer, in which the hydraulic oil or the like used for operating the hydraulic percussion hammer acts upon a control piston with a small piston area that is connected to a follower piston with a large piston area that conveys lubricant to at least one lubricating point of the hydraulic percussion hammer. Due to this differential piston arrangement, the hydraulic oil that is used for operating the hydraulic percussion hammer and usually subjected to a very high pressure can be used for conveying the lubricant with a significantly lower pressure.

Furthermore, U.S. Pat. No. 6,736,292 B2 discloses a motor that is operated with compressed air and can be used for conveying a lubricant from a cartridge to a lubricating point. In this case, the motor features a piston arrangement that can be displaced against the force of a spring by means of the compressed air and is arranged in a housing such that it can be displaced in an oscillating fashion in order to thusly produce a pump stroke of a pump element.

SUMMARY OF THE INVENTION

In general, this invention is directed to a hydraulic device with a supply line for pressurized hydraulic fluid and with a lubricating pump that is connected to the supply line in a fluidic fashion. The lubricating pump comprises a hydraulic inlet, a pump element for conveying a lubricant from a reservoir to at least one lubricating point of the hydraulic device, and means for producing a pump stroke of the pump element. The means for producing a pump stroke comprises a base body, a piston unit movable in the base body, and reversing means for reversing the direction of movement of at least one element of the piston unit. The reversing means comprises at least one bypass formed by at least one groove-like recess, and at least one elastic element acting upon the piston unit in a first direction oriented toward the hydraulic inlet whereby the piston unit can be displaced in the base body in an oscillating fashion between a closed position in which a fluid connection between the hydraulic inlet and the hydraulic outlet is blocked, and an open position in which the fluid connection is unblocked in order to produce a pump stroke of the pump element.

Other advantages and possible applications of the invention result from the following description of embodiments and the figures. In this case, all described and/or graphically illustrated characteristics form the object of the invention individually or in arbitrary combinations, namely regardless of their combination in the claims or their reference to other characteristics.

DETAILED DESCRIPTION

Figure 1:
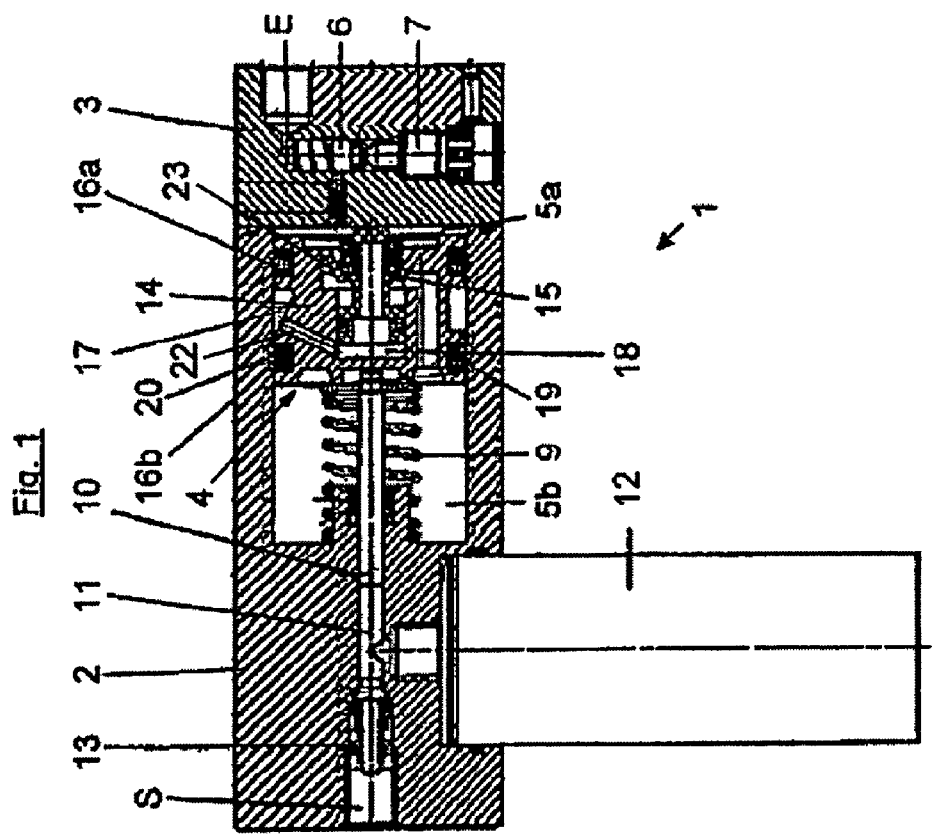
FIG. 1, a longitudinal section through a lubricating pump according to a first embodiment of the invention.
Figure 2:
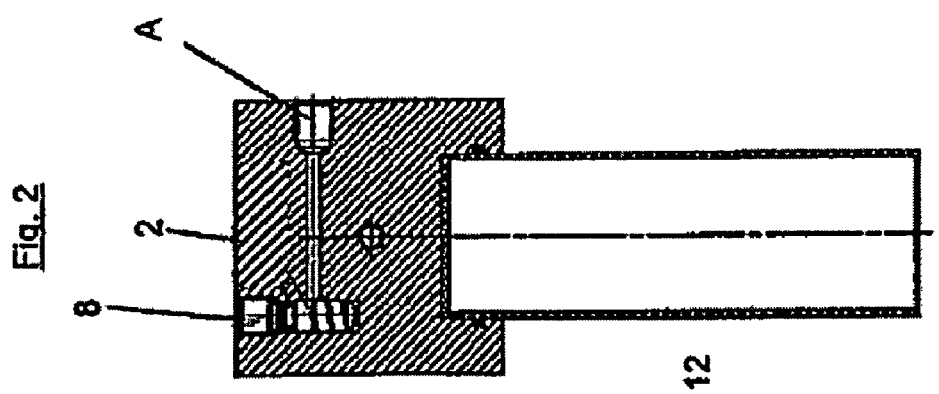
FIG. 2, a cross section through the lubricating pump according to FIG. 1.
Figure 3:
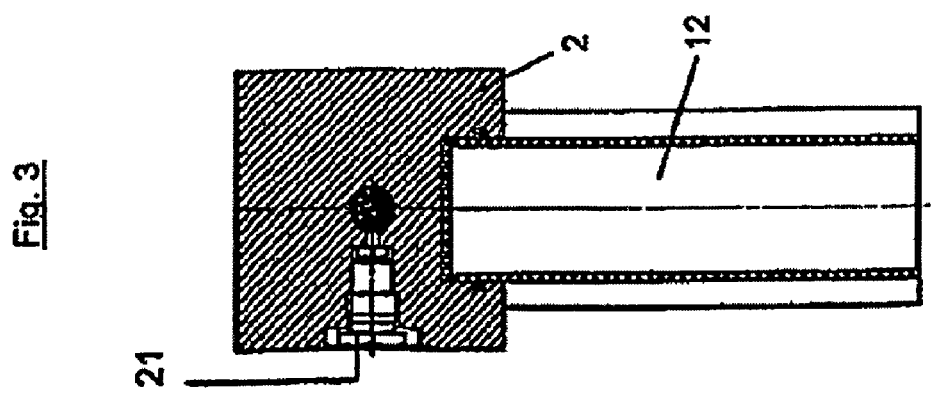
FIG. 3, another cross section through the lubricating pump according to FIG. 1.

The lubricating pump 1 illustrated in FIGS. 1-3 is formed by a base body that is realized in the form of a pump housing 2 that is closed with a control housing 3. A piston unit 4 is displaceably guided in the base body 2, 3 such that a first cavity formed in the base body 2 is divided into two chambers 5a and 5b. A hydraulic inlet E that is connected to a supply line for a pressurized hydraulic fluid used for driving a hydraulic percussion hammer or another hydraulic device leads into the right chamber 5a in FIG. 1 via a valve 6 and a throttle device 7. Analogously, the left chamber 5b in FIG. 1 is connected to a hydraulic outlet A via a throttle device 8.

The piston unit 4 is prestressed relative to the control housing 3 in the base body 2 by means of a pressure spring 9. In other words, the pressure spring 9 acts upon the piston unit 4 toward the right in FIG. 1. In addition, the piston unit 4 is in contact with a delivery piston 10 that acts as a pump element and is guided in a sealed and displaceable fashion within a channel 11 in the base body 2. An inlet of a cartridge 12 that serves as a lubricant reservoir leads into the channel 11. A lubricant outlet S is provided in the base body 2 on the left side in FIG. 1 and is sealed relative to the channel 11 by means of a check valve 13. In this case, the check valve 13 is arranged in such a way that it blocks a flow from the lubricant outlet S in the direction toward the channel 11 while lubricant can flow from the cartridge 12 into the lubricant outlet S through the channel 11. The lubricant outlet S is connected to one or more lubricating points of the hydraulic device.

The piston unit 4 is formed by an outer piston 14 and an inner piston 15. In this case, the outer piston 14 is displaceably guided within the cavity in the base body 2 that forms the two chambers 5a and 5b and is sealed relative to the chambers 5a and 5b with two seals 16a and 16b. A recess is provided in the outer piston 14 between the seals 16a and 16b such that a cavity 17 is formed between the inside surface of the base body 2 and the outside surface of the outer piston 14. This cavity 17 is connected to an additional cavity 18 formed in the interior of the outer piston 14 via an inclined bore 22 in the outer piston 14. The inner piston 15 is displaceably guided in the additional cavity 18. An additional channel 19 is arranged in the outer piston 14 in such a way that the chamber 5b facing the hydraulic outlet A is connected to the additional cavity 18 in the interior of the outer piston 14. The inner piston 15 blocks a flow between the recess 17 and the chamber 5b in this case. However, the inner piston 15 can be lifted off a valve seat 23 provided on the outer piston 14 in order to produce a fluidic connection between the chamber 5a facing the hydraulic inlet E and the additional channel 19 via the inclined bore 22 and the cavity 18.

A groove-like recess 20 provided on the inside wall of the base body 2 is realized in such a way that it forms a bypass in order to enable a fluid to flow from the chamber 5a into the cavity of the recess 17 or from the cavity of the recess 17 into the chamber 5b past the respective seals 16a and 16b. According to FIG. 3, a safety valve 21 may be provided in the base body 2.

Figure 4:
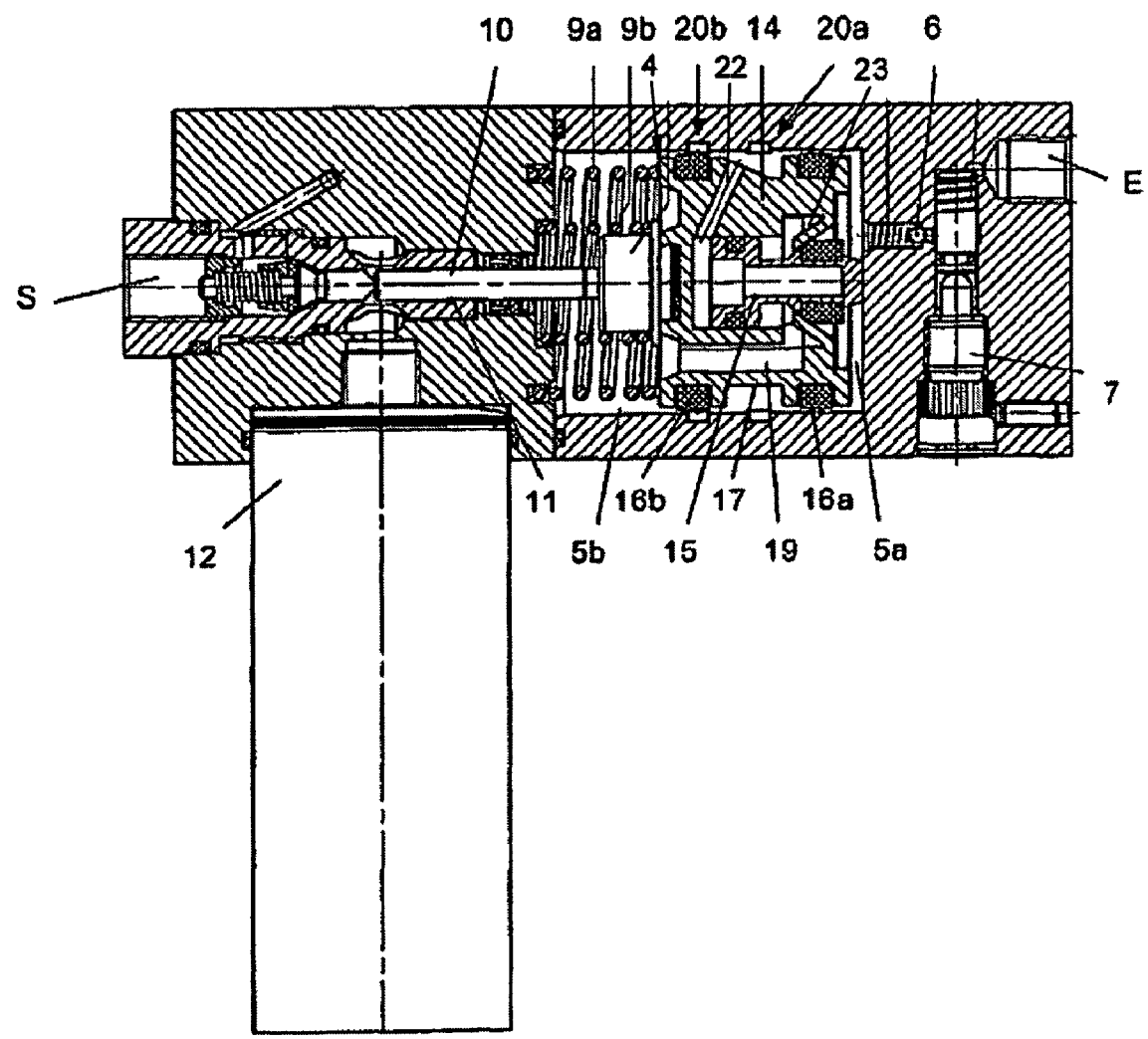
FIG. 4, a longitudinal section through a lubricating pump according to a second embodiment of the invention.

FIG. 4 shows another embodiment of a lubricating pump. The basic design of this lubricating pump is identical to the design described above with reference to FIGS. 1-3. However, the plane of partition of the base body is shifted toward the left in comparison with the embodiment according to FIG. 1.

In addition, two groove-like recesses 20a and 20b are provided at a certain distance from one another in the cavity that forms the two chambers 5a and 5b, wherein the right recess 20a in the figure forms a first bypass when the piston unit 4 is displaced so far toward the left that the seal 16a is situated in the region of the groove-like recess 20a. This enables hydraulic fluid to flow from the chamber 5a through the bypass 20a into the cavity formed by the recess 17. The left recess 20b in the figure, in contrast, is arranged such that it forms a second bypass when the seal 16b is situated in the position shown in FIG. 4. This enables the fluid to flow from the cavity formed by the recess 17 through the bypass 20b into the chamber 5b.

The design of the lubricating pump with two groove-like recesses 20a, 20b that respectively form a bypass makes it possible to reduce the stroke of the piston unit in comparison with the embodiment illustrated in FIGS. 1-3.

In the embodiment according to FIG. 4, the piston unit 4 is assigned two coaxially arranged pressure springs 9a and 9b, both of which act upon the outer piston 14 toward the right in the figure, i.e., in the direction toward the hydraulic inlet E. A particularly quick return stroke of the piston unit 4 can be achieved in this fashion.

The function of the lubricating pump is described in greater detail below. For example, hydraulic oil that is also used for driving a hydraulic device not illustrated in the figures, e.g., a percussion hammer, is supplied to the lubricating pump via the hydraulic inlet E. In this case, the hydraulic oil flows into the chamber 5a through the throttle device 7 and the check valve 6. The pressure of the hydraulic oil causes the piston unit 4 to be displaced toward the left from the position illustrated in FIGS. 1 and 4 against the force of the respective pressure springs 9a and 9b. In this case, the throttle device 7 is preferably adjusted in such a way that the piston unit 4 only moves very slowly. The inner piston 15 is pressed into its valve seat 23 in the outer piston 14 such that the hydraulic oil cannot flow through between the inner piston 15 and the outer piston 14.

The movement of the piston unit 4 also causes the delivery piston 10 to be displaced toward the left in FIGS. 1 and 4. Consequently, the lubricant situated in the channel 11 is conveyed to the lubricant outlet S that is connected to a not-shown lubricating point of the percussion hammer or the like through the check valve 13. As soon as the seal 16a in FIG. 1 reaches the groove-like recess 20, the hydraulic oil also flows into the cavity of the recess 17 past the seal 16a through the bypass formed by the groove-like recess 20 and therefore also into the inclined bore 22 and additional cavity 18 in the interior of the outer piston 14. This causes the inner piston 15 to be lifted off its valve seat 23 in the outer piston 14 and to be displaced relative to the outer piston 14 toward the right in the figures. In the embodiment according to FIG. 4, this opening of the inner piston 15 in the outer piston 14 is achieved in that the seal 16a reaches the groove-like recess 20a and the bypass is opened in this fashion.

The hydraulic oil can now flow through the piston unit 4 via the channel 19 such that a pressure compensation between the chambers 5a and 5b can take place. The respective springs 9 or 9a and 9b are realized in such a way that the entire piston unit 4 is once again displaced back toward the right in FIGS. 1 and 4 as quickly as possible such that the inner piston 15 also is once again pressed against its valve seat 23 in the outer piston 14. In this case, the hydraulic oil situated in the additional cavity 18 can flow into the chamber 5b via a bypass when the seal 16b reaches the respective groove-like recess 20 or 20b. The inner piston 15 can only adjoin the valve seat 23 in the outer piston 14 in a sealed fashion once the hydraulic oil is pressed out of the additional cavity 18. The delivery piston 10 is also moved toward the right in FIGS. 1 and 4 in this case such that lubricant is drawn from the cartridge 12 into the channel 11 by suction. The lubricating pump therefore is once again situated in its initial position illustrated in FIGS. 1 and 4 such that a new stroke of the piston unit 4 can begin.

It will be observed from the foregoing that the present invention is based on the objective of developing a hydraulic device of the initially cited type with a lubricating pump that is characterized by a highly reliable and simple operation and a cost-efficient manufacture.

According to the invention, this objective is essentially attained in that a piston unit is provided as the means for producing the pump stroke, wherein the piston unit is assigned means for reversing the direction of movement of at least one element of the piston unit with at least one bypass that is formed, in particular, by at least one recess and with at least one elastic element acting upon the piston unit in a first direction oriented toward the hydraulic inlet, namely in such a way that the piston unit can be displaced in a base body in an oscillating fashion between a closed position, in which a fluid connection between the hydraulic inlet and a hydraulic outlet is blocked, and an open position, in which this fluid connection is unblocked, in order to produce the pump stroke. Due to these measures, it is possible to utilize the pressurized hydraulic fluid not only for driving a hydraulic device (e.g., a hydraulic percussion hammer) but also for conveying lubricant to lubricating points of the hydraulic device.

According to the invention, the means for reversing the direction of movement feature a first bypass and a second bypass that are spaced apart from one another. In one embodiment, the bypasses are in the form of groove-like recesses. In this case, the first bypass may be assigned to the piston unit for initiating a movement of one element of the piston unit relative to another element of the piston unit while the second bypass makes it possible for the piston arrangement to reach an end position. In comparison with motors or the like that feature only one bypass, the stroke of the piston unit can be significantly reduced with this design.

In the embodiment described above, a first cavity is defined in a base body of the lubricating pump and divided into two chambers by the piston unit displaceably guided therein, wherein the first chamber can be connected to the hydraulic inlet, if applicable, by means of a valve and/or a throttle device and the second chamber can be connected to the hydraulic outlet, if applicable, by means of a valve and/or a throttle device. When the hydraulic fluid used for operating the hydraulic percussion device or the like acts upon the hydraulic inlet, the piston unit is displaced in the base body against the force of the elastic element. This means that the piston unit also acts upon the pump element, e.g., a delivery piston, such that lubricant is conveyed to a lubricating point.

According to the invention, the piston unit features an outer piston with a second cavity defined therein that is guided in the first cavity of the base body and an inner piston that is guided in the second cavity. In this case, a third cavity that is connected to the second cavity in a fluidic fashion is defined between the outside surface of the outer piston and the inside surface of the base body. This design of the piston unit makes it possible to produce a fluid connection between the side of the piston unit that faces the hydraulic inlet and the side that faces the hydraulic outlet in order to thusly realize a reversal of the piston unit.

The third cavity can be sealed relative to the first cavity, i.e., relative to the two chambers that are divided by the piston unit, by providing at least two sealing elements at a certain distance from one another on the outside surface of the outer piston.

The reversal of the piston unit can be realized in that the inner piston can be displaced in the outer piston between a closed position, in which a fluid connection through the piston unit between the side of the outer piston that faces the hydraulic inlet and the side that faces the hydraulic outlet is blocked, and an open position, in which this fluid connection is unblocked. In other words, the piston unit is displaced in a first direction against the restoring force of the elastic element by the force of the hydraulic fluid when the piston unit is situated in its closed position while the piston unit can be displaced back in the opposite direction by means of the restoring force of the elastic element when the piston unit is situated in its open position.

In order to prevent the force of the elastic element from causing an excessively high pressure loss of the hydraulic fluid during the reversal and the return movement of the piston unit, the reversal and the return movement of the piston unit need to take place as quickly as possible. To this end, at least two springs may be provided to act upon the piston unit, particularly upon the outer piston, in the direction of the side facing the hydraulic inlet. These springs make it possible to quickly block the fluid connection through the piston unit and to displace the piston unit back in the direction of the side facing the hydraulic inlet.

According to one preferred embodiment of the invention, the third cavity and the first chamber can be mutually sealed by the outer piston and a seal provided thereon and can be connected via a first bypass that is opened due to the displacement of the outer piston in the first cavity. The reversal and return movement of the piston unit are initiated when the first bypass is opened. Consequently, the arrangement of the first bypass defines the length of the stroke of the piston unit during the operation.

In order to completely close the fluid passage through the piston unit, the third cavity and the second chamber can be mutually sealed by the outer piston and a seal provided thereon and connected via a bypass that is opened due to the displacement of the outer piston in the first cavity.

In this case, the first bypass may be formed by a first groove-like recess in the inside surface of the base body. The bypass connecting the third cavity and the second chamber may either also be formed by the first groove-like recess in the inside surface of the base body or, alternatively, by a second groove-like recess in the inside surface of the base body that is spaced apart from the first groove-like recess.

The lubricant is conveyed to a lubricating point of the hydraulic device in that the pump element is guided in the base body in a sealed and displaceable fashion within a channel containing an inlet that is connected to the reservoir in a fluidic fashion. In this case, a check valve is provided in the channel on the side that faces the lubricating point. The check valve opens when the piston unit moves in the direction toward the hydraulic outlet and closes during the return stroke of the piston unit.

LIST OF REFERENCE SYMBOLS

1 Lubricating pump
2 Base body (pump housing)
3 Control housing
4 Piston unit
5a, 5b Chamber
6 Valve
7 Throttle device
8 Throttle device
9 Pressure spring
9a, 9b Pressure spring
10 Delivery piston (pump element)
11 Channel
12 Cartridge
13 Valve
14 Outer piston
15 Inner piston
16a, 16b Seal
17 Recess (cavity)
18 Cavity
19 Channel
20, 20a, 20b Bypass/recess
21 Safety valve
22 Inclined bore
23 Valve seat
A Hydraulic outlet
E Hydraulic inlet
S Lubricant outlet

What is claimed is:

1. A hydraulic device with a supply line for pressurized hydraulic fluid and with a lubricating pump that is connected to the supply line in a fluidic fashion, said lubricating pump comprising a hydraulic inlet, a pump element for conveying a lubricant from a reservoir to at least one lubricating point of the hydraulic device, and means for producing a pump stroke of the pump element, characterized in that said means for producing a pump stroke comprises a base body, a piston unit movable in the base body, and reversing means for reversing the direction of movement of at least one element of the piston unit, said reversing means comprising at least one bypass formed by at least one recess, and at least one elastic element acting upon the piston unit in a first direction oriented toward the hydraulic inlet whereby the piston unit can be displaced in the base body in an oscillating fashion between a closed position in which a fluid connection between the hydraulic inlet and the hydraulic outlet is blocked, and an open position in which said fluid connection is unblocked in order to produce said pump stroke of the pump element, said reversing means comprising a first bypass and a second bypass that are spaced apart from one another.

2. The hydraulic device according to claim 1, characterized in that a first cavity is defined in the base body of the lubricating pump and is divided into first and second chambers by the piston unit, and wherein the first chamber can be connected to the hydraulic inlet by means of a valve and/or a throttle device and the second chamber can be connected to the hydraulic outlet by means of a valve and/or a throttle device.

3. The hydraulic device according to claim 1, characterized in that the piston unit comprises an outer piston that is guided in a first cavity in the base body and an inner piston that is guided in a second cavity in the outer piston, and wherein a third cavity that is connected to the second cavity in a fluidic fashion is defined between an outside surface of the outer piston and the an inside surface of the base body.

4. The hydraulic device according to claim 3, characterized in that at least two sealing elements are provided at a distance from one another on the outside surface of the outer piston in order to seal the third cavity relative to the first cavity.

5. The hydraulic device according to one of claim 3, characterized in that the inner piston can be displaced in the outer piston between a closed position blocking a fluid connection through the piston unit between a side of the outer piston that faces the hydraulic inlet and a side of the outer piston that faces the hydraulic outlet, and an open position in which said fluid connection is unblocked.

6. The hydraulic device according to one of claim 3, characterized in that at least two springs urge the outer piston in a direction toward the hydraulic inlet.

7. The hydraulic device according to claim 3, characterized in that the third cavity and the first chamber can be mutually sealed by the outer piston and a seal provided thereon and connected via said at least one bypass that is opened due to the displacement of the outer piston in the first cavity.

8. The hydraulic device according to claim 3, characterized in that the third cavity and the second chamber can be mutually sealed by the outer piston and a seal provided thereon and connected via said at least one bypass that is opened due to the displacement of the outer piston in the first cavity.

9. The hydraulic device according to claim 7, characterized in that the at least one bypass is formed by a first groove-like recess in the inside surface of the base body.

10. The hydraulic device according to claim 8, characterized in that the at least one bypass is formed by a first groove-like recess in the inside surface of the base body.

11. The hydraulic device according to claim 10, characterized in that the bypass connecting the third cavity and the second chamber is formed by a second groove-like recess in the inside surface of the base body that is spaced apart from the first groove-like recess.

12. The hydraulic device according to claim 1, characterized in that the pump element for conveying lubricant is guided in the base body in a sealed and displaceable fashion within a channel containing an inlet that is connected to the reservoir in a fluidic fashion, and in that a check valve is provided in the channel on a side that faces the lubricating point.

13. A hydraulic device with a supply line for pressurized hydraulic fluid and with a lubricating pump that is connected to the supply line in a fluidic fashion, said lubricating pump comprising a hydraulic inlet, a pump element for conveying a lubricant from a reservoir to at least one lubricating point of the hydraulic device, and means for producing a pump stroke of the pump element, characterized in that said means for producing a pump stroke comprises a base body, a piston unit movable in the base body, and reversing means for reversing the direction of movement of at least one element of the piston unit, said reversing means comprising at least one bypass formed by at least one recess, and at least one elastic element acting upon the piston unit in a first direction oriented toward the hydraulic inlet whereby the piston unit can be displaced in the base body in an oscillating fashion between a closed position in which a fluid connection between the hydraulic inlet and the hydraulic outlet is blocked, and an open position in which said fluid connection is unblocked in order to produce said pump stroke of the pump element, wherein the piston unit comprises an outer piston that is guided in a first cavity in the base body and an inner piston that is guided in a second cavity in the outer piston, and wherein a third cavity that is connected to the second cavity in a fluidic fashion is defined between an outside surface of the outer piston and an inside surface of the base body, wherein the third cavity and the second chamber can be mutually sealed by the outer piston and a seal provided thereon and connected via said at least one bypass that is opened due to the displacement of the outer piston in the first cavity, wherein the at least one bypass is formed by a first groove-like recess in the inside surface of the base body, and wherein the bypass connecting the third cavity and the second chamber is formed by a second groove-like recess in the inside surface of the base body that is spaced apart from the first groove-like recess.

* * * * *